(12) United States Patent
Lai (10) Patent No.: US 11,411,431 B2
(45) Date of Patent: Aug. 9, 2022

(54) PAD FOR WIRELESS CHARGING AND MANUFACTURING METHOD THEREOF

(71) Applicant: E-CENTURY TECHNICAL & INDUSTRIAL CORPORATION, New Taipei (TW)

(72) Inventor: I-Kuang Lai, New Taipei (TW)

(73) Assignee: E-CENTURY TECHNICAL & INDUSTRIAL CORPORATION, New Taipei (TW)

( * ) Notice: Subject to any disclaimer, the term of this patent is extended or adjusted under 35 U.S.C. 154(b) by 283 days.

(21) Appl. No.: 16/796,136

(22) Filed: Feb. 20, 2020

(65) Prior Publication Data

US 2021/0184497 A1 Jun. 17, 2021

(30) Foreign Application Priority Data

Dec. 16, 2019 (TW) ................................ 108146056

(51) Int. Cl.
*H02J 50/00* (2016.01)
*H01F 41/061* (2016.01)
(Continued)

(52) U.S. Cl.
CPC .............. *H02J 50/005* (2020.01); *H01F 5/04* (2013.01); *H01F 41/061* (2016.01); *H02J 50/10* (2016.02)

(58) Field of Classification Search
CPC ........... H02J 50/005; H02J 50/10; H01F 5/04; H01F 41/061; H01F 27/306; H01F 27/327; H01F 38/14
See application file for complete search history.

(56) References Cited

U.S. PATENT DOCUMENTS 9,318,899 B2 * 4/2016 Yoon ........................ H02J 7/025
2014/0375260 A1 * 12/2014 Janssen ................... H01F 38/14
320/108

(Continued)

FOREIGN PATENT DOCUMENTS

CN 208209583 U 12/2018
CN 112955985 A * 6/2021 ........... H05K 7/2039

(Continued)

OTHER PUBLICATIONS

Office Action dated Mar. 5, 2021 of the corresponding Taiwan patent application No. 108146056.

*Primary Examiner* — Stacy Whitmore
(74) *Attorney, Agent, or Firm* — Chun-Ming Shih; HDLS IPR Services (57) ABSTRACT

In a pad for wireless charging and a manufacturing method thereof, the pad includes: a carrier sheet, a coil and a first and second pad layers. The coil is secured on the carrier sheet and jointly forms an intermediate layer. The intermediate layer is clamped and secured between the first and second pad layers. The first and second pad layers with the intermediate layer clamped therebetween are arranged opposite from each other and attached onto each other to form a pad main body. The manufacturing method includes: a securement step for securing the coil, a clamping step for clamping the intermediate layer and a thermoforming step for thermoforming into the pad main body. Accordingly, the effect of successfully clamping and securing the carrier sheet together with the coil between the first and second pad layers before the thermoforming thereof can be achieved.

9 Claims, 8 Drawing Sheets

(51) Int. Cl.
*H01F 5/04* (2006.01)
*H02J 50/10* (2016.01)

(56) References Cited

U.S. PATENT DOCUMENTS

| | | | |
|---|---|---|---|
| 2016/0310948 A1* | 10/2016 | Nowakowski | C12Q 1/6816 |
| 2016/0322156 A1* | 11/2016 | Yeh | H01F 38/14 |
| 2018/0025838 A1* | 1/2018 | Som | H05B 6/1272 |
| | | | 361/143 |
| 2020/0168393 A1* | 5/2020 | Long | H01F 27/2847 |
| 2020/0218370 A1* | 7/2020 | Lu | H02J 7/025 |

FOREIGN PATENT DOCUMENTS

| | | | | |
|---|---|---|---|---|
| CN | 110815336 B | * | 10/2021 | B08B 15/02 |
| TW | M581529 U | | 8/2019 | |

\* cited by examiner

PAD FOR WIRELESS CHARGING AND MANUFACTURING METHOD THEREOF

BACKGROUND OF THE INVENTION

Field of the Invention

The technical field relates to a securement of a coil with a pad, in particular, to a pad for wireless charging and a manufacturing method thereof.

Description of Related Art

Since there are a lot of electronic products are equipped with batteries, to supply electrical power already consumed, presently, a wireless charging method is available to perform charging of electronic products.

However, currently available wireless chargers are mostly designed to be a specialized wireless charging seat such that they cannot be used in combination with existing objects. As a result, the quantity of objects used by people becomes greater and messier while occupying more spaces.

In view of the above, the inventor seeks to combine the technology of wireless charging with an existing pad (such as mouse pad, non-slip pad, cushion pad or protection pad). Nevertheless, the following technical problem is found to be overcome: a coil for wireless transmission cannot be secured inside a soft gel (pad is a soft gel without a fixed shape before thermoforming), and this is a main issue to be solved by the inventor.

SUMMARY OF THE INVENTION

An objective of the present invention is to provide a pad for wireless charging and a manufacturing method thereof, and it is mainly to allow a coil to be successfully secured between a first pad layer and a second pad layer without a fixed shape before thermoforming.

To achieve the aforementioned objective, the present invention provides a pad for wireless charging, comprising: a pad main body configured as a flexible pad and having a first pad layer and a second pad layer arranged opposite from each other and attached onto each other; a carrier sheet configured to be flexible sheet; and a coil secured onto a surface of the carrier sheet and jointly forming an intermediate layer with the carrier sheet; the intermediate layer clamped and secured between the first pad layer and the second pad layer.

The present invention further provides a manufacturing method for a pad for wireless charging, comprising: a securement step to secure a coil onto a surface of a carrier sheet in order to jointly form an intermediate layer; a clamping step to clamp the intermediate layer between a first pad layer and a second pad layer, and the first pad layer and the second pad layer configured to be a pre-thermoforming soft gel member in the clamping step; and a thermoforming step to heat the first pad layer and the second pad layer having the intermediate layer clamped therebetween in order to allow the first pad layer and the second pad layer to be arranged opposite from each other and attached onto each other to form a pad main body.

In comparison with the prior art, the present invention is able to achieve the following technical effects. The present invention is able to allow the carrier sheet together with the coil to be successfully clamped and secured between the first pad layer and the second pad layer before thermoforming such that the currently encountered technical problem of the difficulty in securing the coil between the first pad layer and the second pad layer before thermoforming can be completely overcome.

DETAILED DESCRIPTION OF THE INVENTION

The following provides a detailed technical content of the present invention along with the accompanied drawings. However, the accompanied drawings are provided for reference and illustrative purpose only such that they shall not be used to limit the scope of the present invention.

Figure 1:
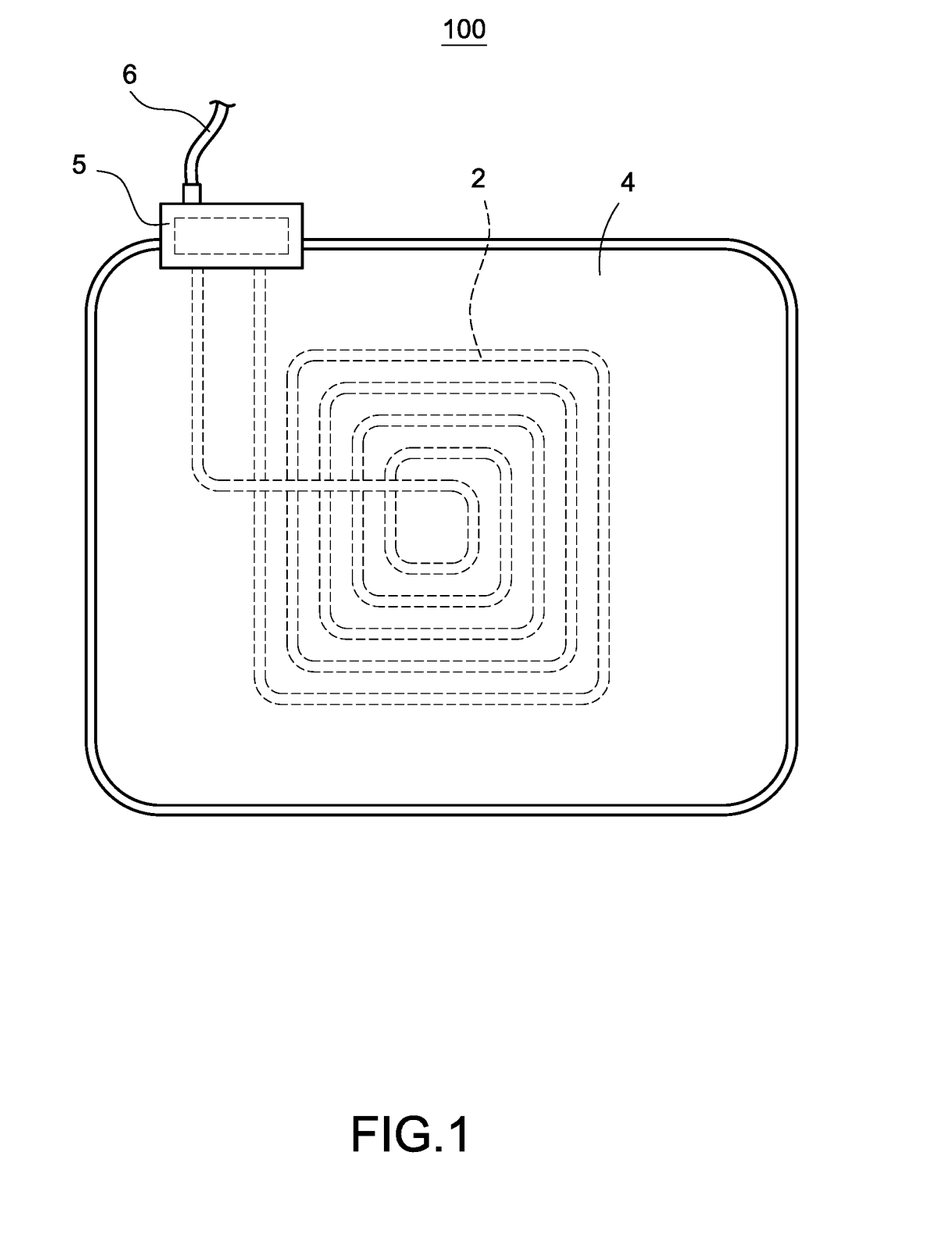
FIG. 1 is a top view of the pad according to the first embodiment of the present invention.
Figure 2:
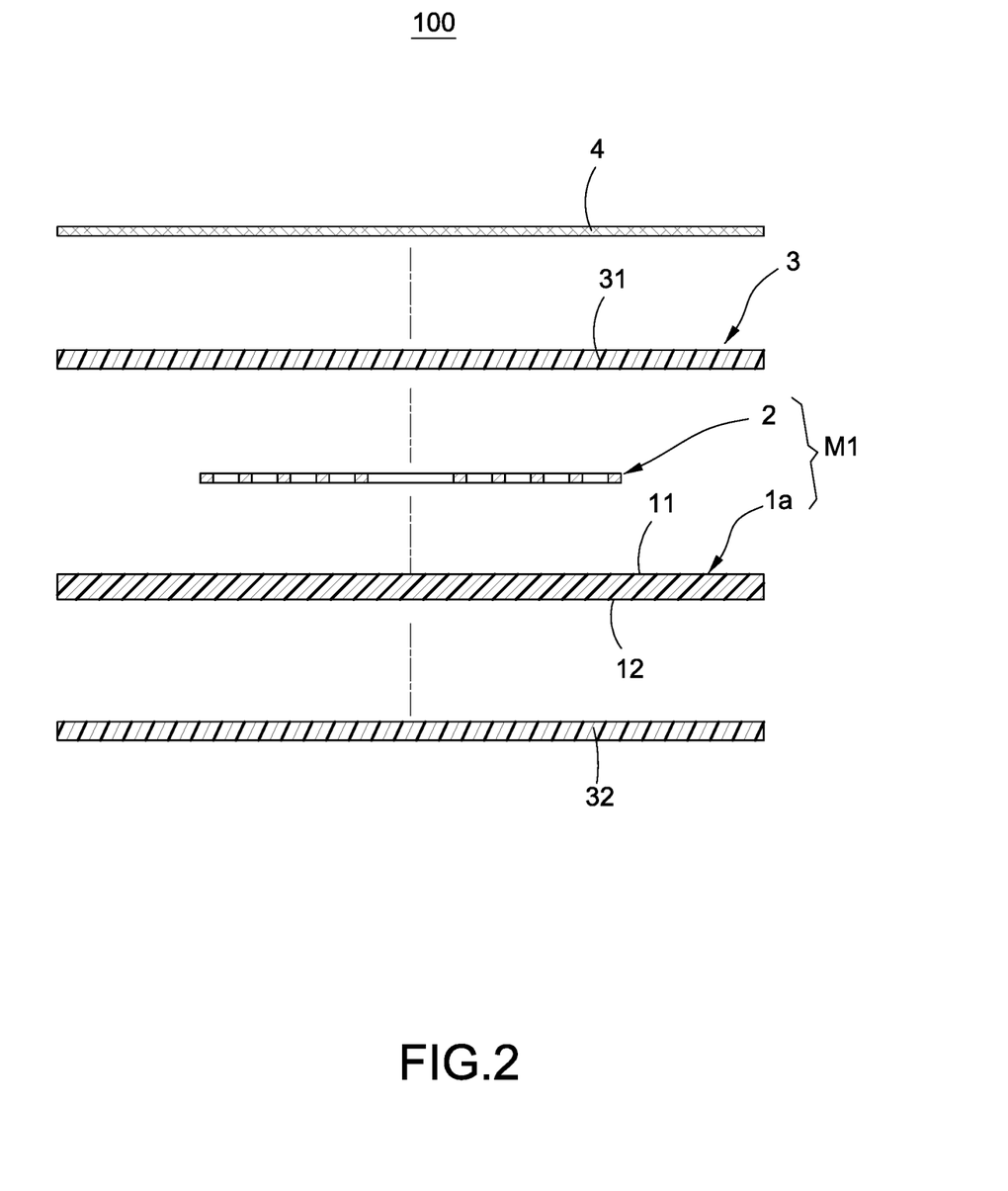
FIG. 2 is a cross sectional view of the pad under the exploded state according to the first embodiment of the present invention.
Figure 3:
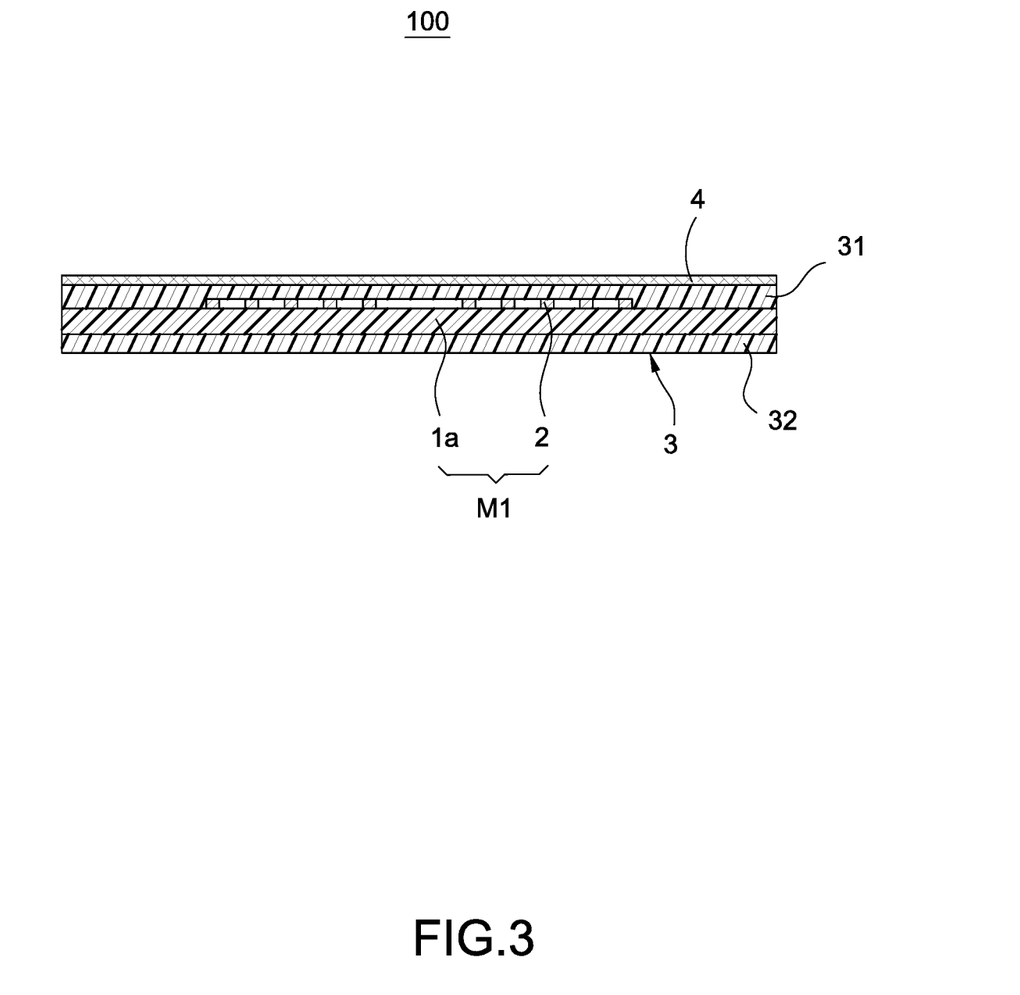
FIG. 3 is a cross sectional view of the pad of the present invention shown in FIG. 2 after the assembly thereof.
Figure 4:
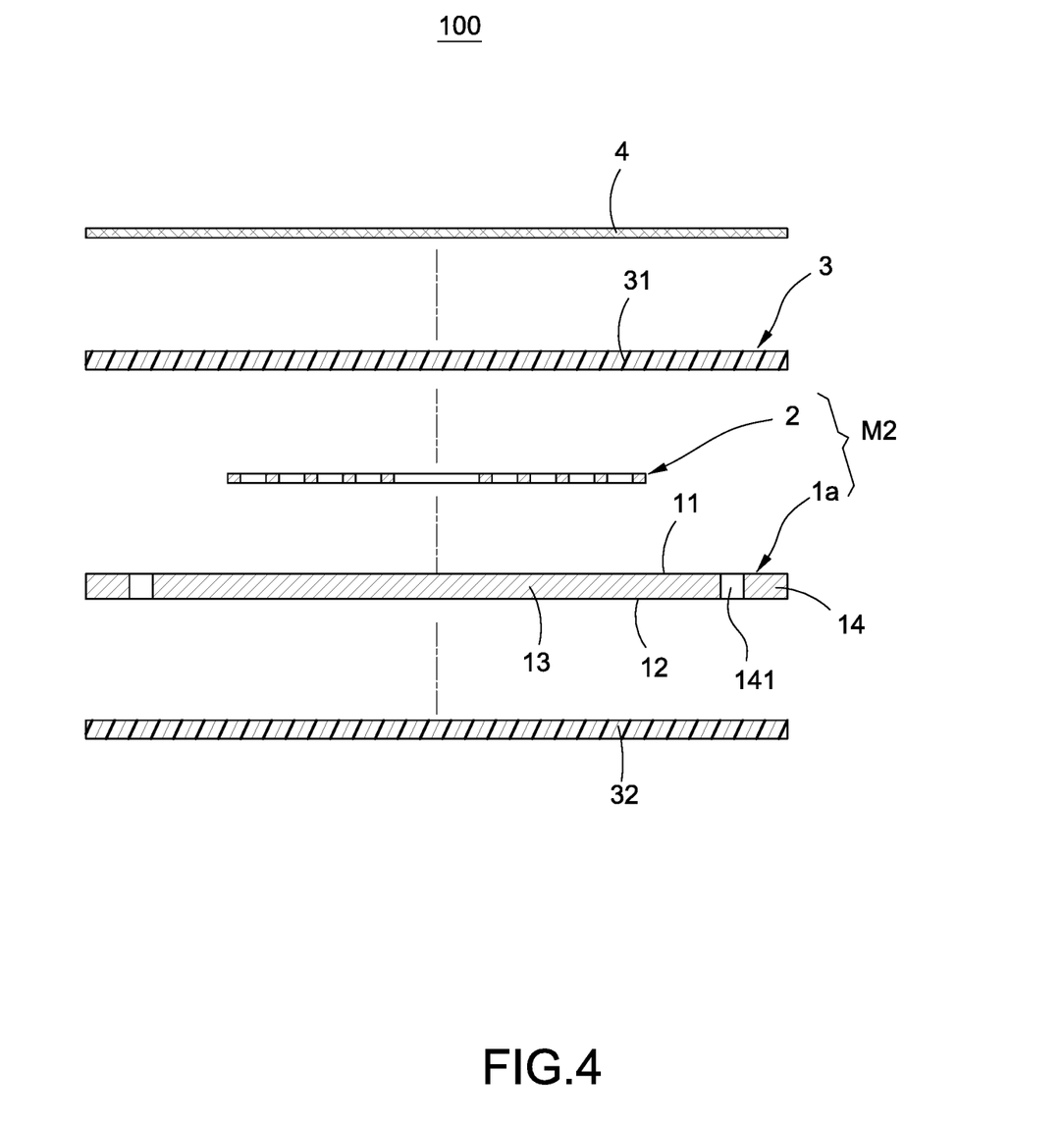
FIG. 4 is a cross sectional view of the pad under the exploded state according to the second embodiment of the present invention.
Figure 5:
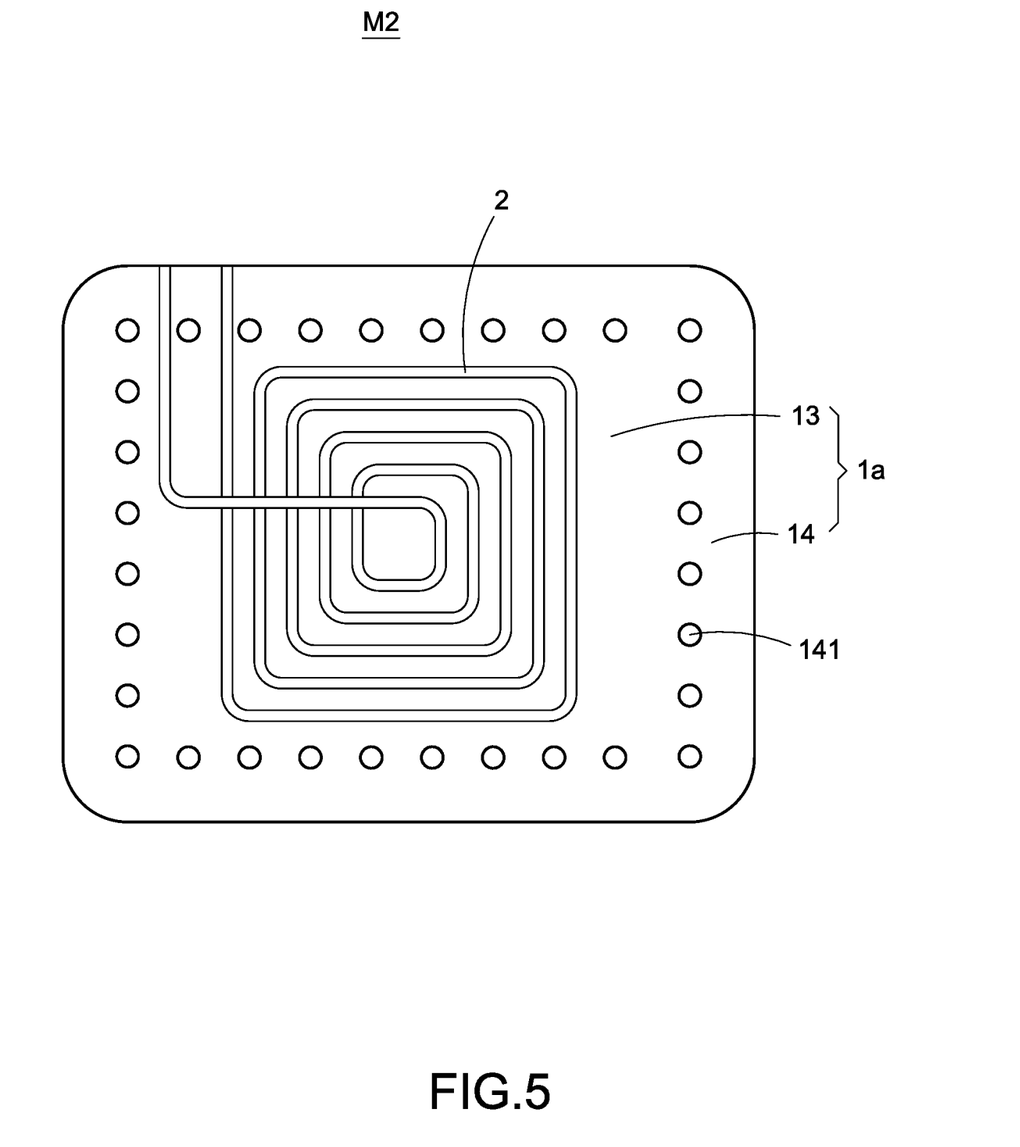
FIG. 5 is a top view illustrating the assembly of the intermediate layer in the pad shown in FIG. 4.

The present invention provides a pad for wireless charging and a manufacturing method thereof. FIG. 1 to FIG. 3 illustrate a first exemplary embodiment of a pad for wireless charging (referred to as the "pad") of the present invention, FIG. 4 to FIG. 5 illustrate a second exemplary embodiment of the pad of the present invention and IG 6 to FIG. 7 illustrate a third exemplary embodiment of the pad of the present invention. FIG. 8 illustrates a flowchart of the manufacturing process of the present invention.

As shown in FIG. 1 to FIG. 3, according to a first exemplary embodiment of the present invention, a pad 100 comprises: a carrier sheet 1a, a coil 2 and a pad main body 3. To be more specific, it further comprises a contact layer 4, a control member 5 and a transmission wire 6.

The pad man body 3 is configured to be a flexible pad. The pad main body 3 includes a first pad layer 31 and a second pad layer 32 arranged opposite from each other and attached onto each other. Regarding the attachment method for the first pad layer 31 and the second pad layer 32 arranged opposite from each other to be attached onto each other, in this exemplary embodiment, a thermoforming method is used as an example for illustration. It shall be noted that before the thermoforming of the first pad layer 31 and the second pad layer 32, they are soft gel members without a fixed shape. The first pad layer 31 and the second pad layer 32 after the thermoforming are arranged opposite from each other and attached onto each other, which are further cured to form a pad main body 3 having a fixed shape.

The carrier sheet 1a is configured to be a flexible sheet. Preferably, the carrier sheet 1a is also an unmalleable sheet such that it can only be bent but without elongation in order to prevent any deformation of the secured coil 2 along the surface direction of the carrier sheet 1a due to the elongation. For example, the carrier sheet 1a can be an insulating film (such as a gel type film) or an insulating sheet (such as a gel type sheet), and the present invention is not limited to such type only. In addition, the carrier sheet 1a includes a first surface 11 and a second surface 12 opposite from each other.

The coil 2 is used to transmit a wireless signal to the product to be charged not shown in the drawings. The coil 2 is secured onto the first surface 11 of the carrier sheet 1a (or it can also be secured onto the second surface 12). In addition, the carrier sheet 1a and the coil 2, after securement with each other, jointly form an intermediate layer M1. In addition, the method of the coil 2 secured onto the carrier sheet 1a can be, for example, an adhesive attachment for securement; however, the present invention is not limited to such method only.

The intermediate layer M1 is clamped and secured between the first pad layer 31 and the second pad layer 32 in order to allow the first pad layer 31 and the second pad layer 32 to be attached and secured onto the first surface 11 and the second surface 12 respectively.

Accordingly, for the present invention, since the coil 2 is secured onto the carrier sheet 1a, the carrier sheet 1a together with the coil 2 can be successfully clamped and secured between the first pad layer 31 and the second pad layer 32 before the thermoforming, thereby overcoming the technical problem associated with the difficulty in securing the coil 2 between the first pad layer 31 and the second pad layer 32 before the thermoforming.

In this exemplary embodiment of the present invention, the pad 100 can further include a control member 5, and the coil 2 and the transmission wire 2 are connected to the control member 5 with electrical conduction. Accordingly, the pad 100 of the present invention is able to utilize the control member 5 to convert the electrical power from the transmission wire 6 into a transmission signal, followed by transmitting such transmission signal to the external wirelessly via the coil 2. Consequently, a product to be charged that is placed on the pad 100 is able to receive the signal and convert it into electrical power for storage, thereby achieving wireless charging.

The pad 100 of the present invention can be any one of a mouse pad, a non-slip pad, a cushion pad and a protection pad etc., and the present invention is not limited to such types only. In this exemplary embodiment, a mouse pad is used as an example for illustration.

In addition, to allow a user to contact or a product to be charged to contact the pad, the pad 100 of the present invention can additionally include a contact layer 4 disposed on the first pad layer 31.

As shown in FIG. 4 to FIG. 5, a second exemplary embodiment of the pad 100 of the present invention is generally the same as the first exemplary embodiment, and the difference mainly relies in the intermediate layer M2 in the second exemplary embodiment.

In the intermediate layer M2, the carrier sheet 1a is divided into a coil securement portion 13 and a remaining portion 14 other than the coil securement portion 13. The aforementioned coil 2 is secured onto the coil securement portion 13, and the remaining portion 14 includes a plurality of exhaust vents 14 formed thereon in order to achieve the effect of exhausting air when the intermediate layer M2 is secured between the first pad layer 31 and the second pad layer 32, thereby preventing excessive air at the attachment areas between the intermediate layer M2 and the first pad layer 31 and the second pad layer 32. As a result, the bonding among different layers of the pad 100 can be ensured. As shown in FIG. 5, the exhaust vents 141 are formed to surround the coil 2 correspondingly.

Figure 6:
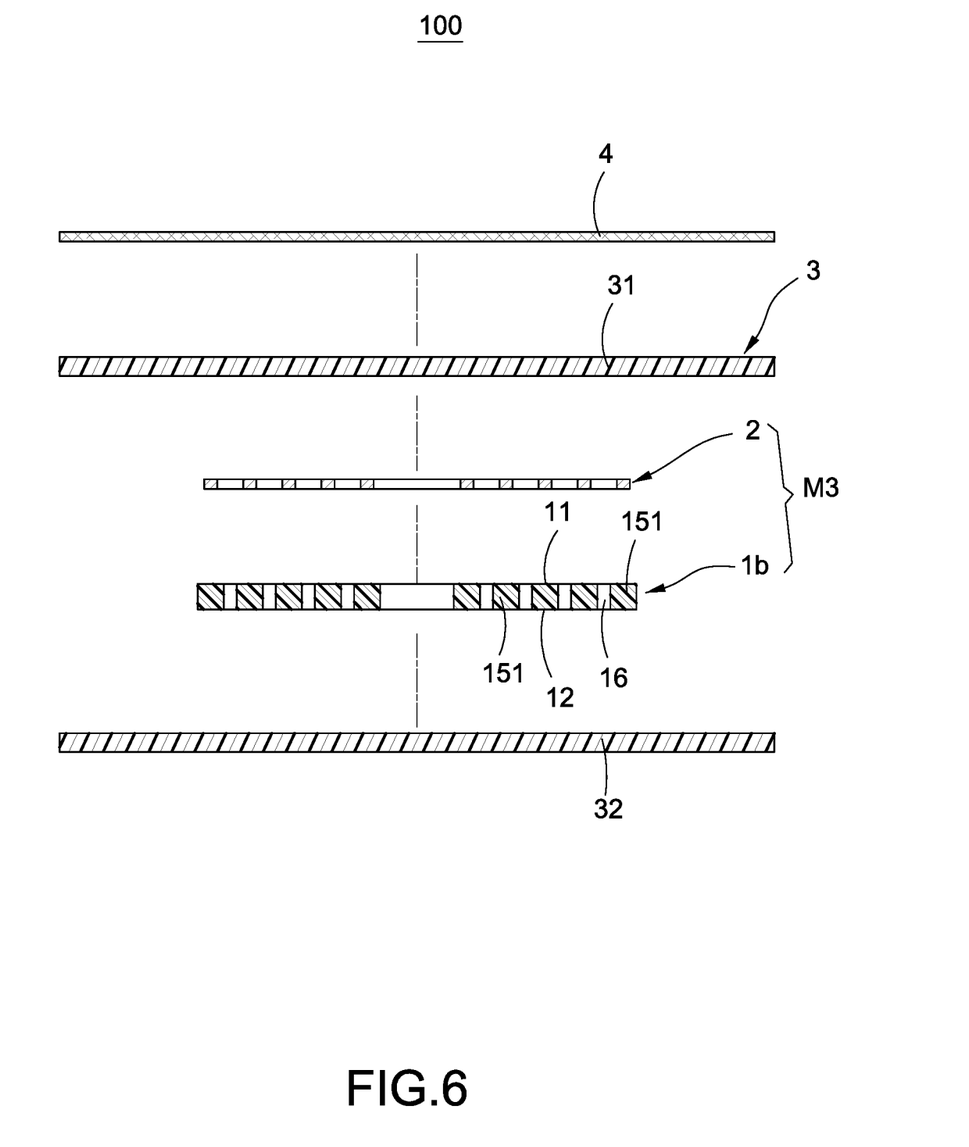
FIG. 6 is a cross sectional view of the pad under the exploded state according to the second embodiment of the present invention.
Figure 7:
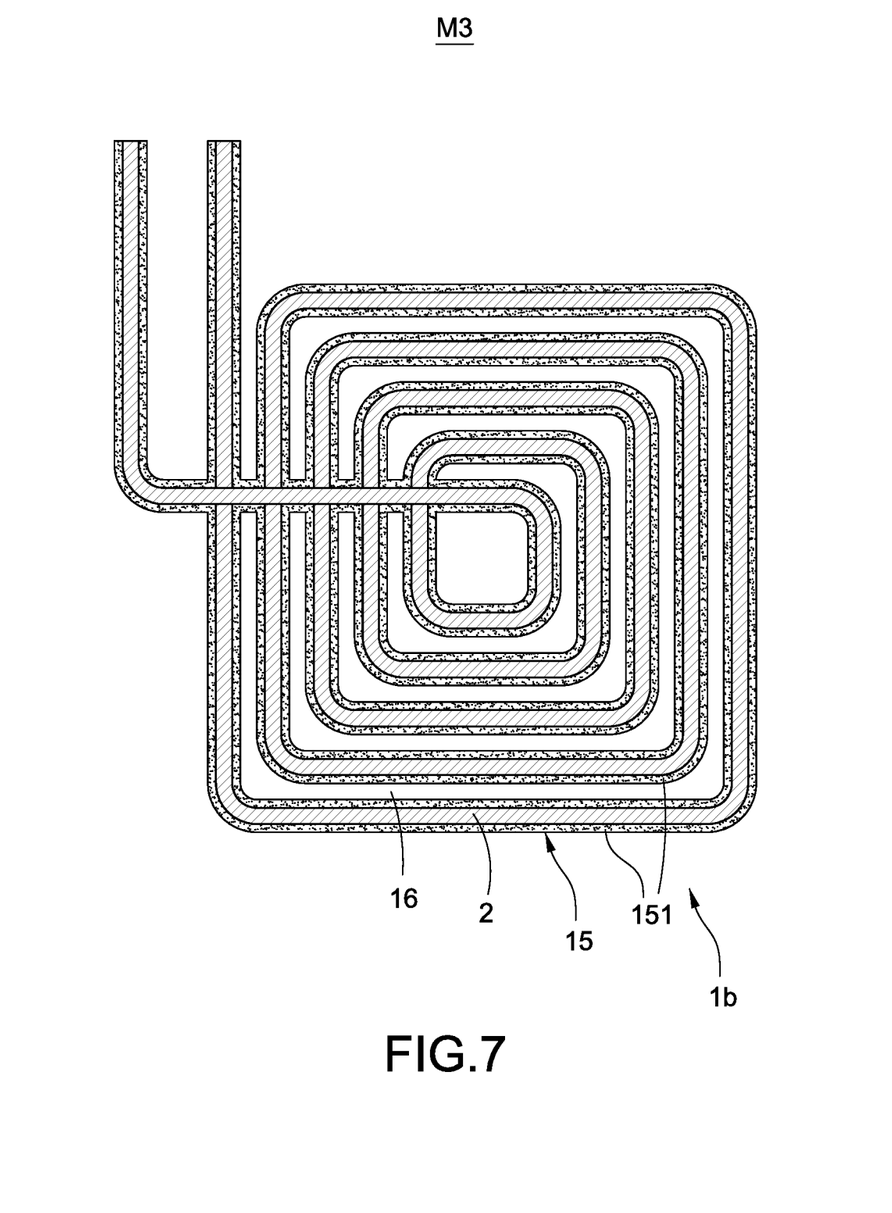
FIG. 7 is a top view illustrating the assembly of the intermediate layer in the pad shown in FIG. 6.
Figure 8:
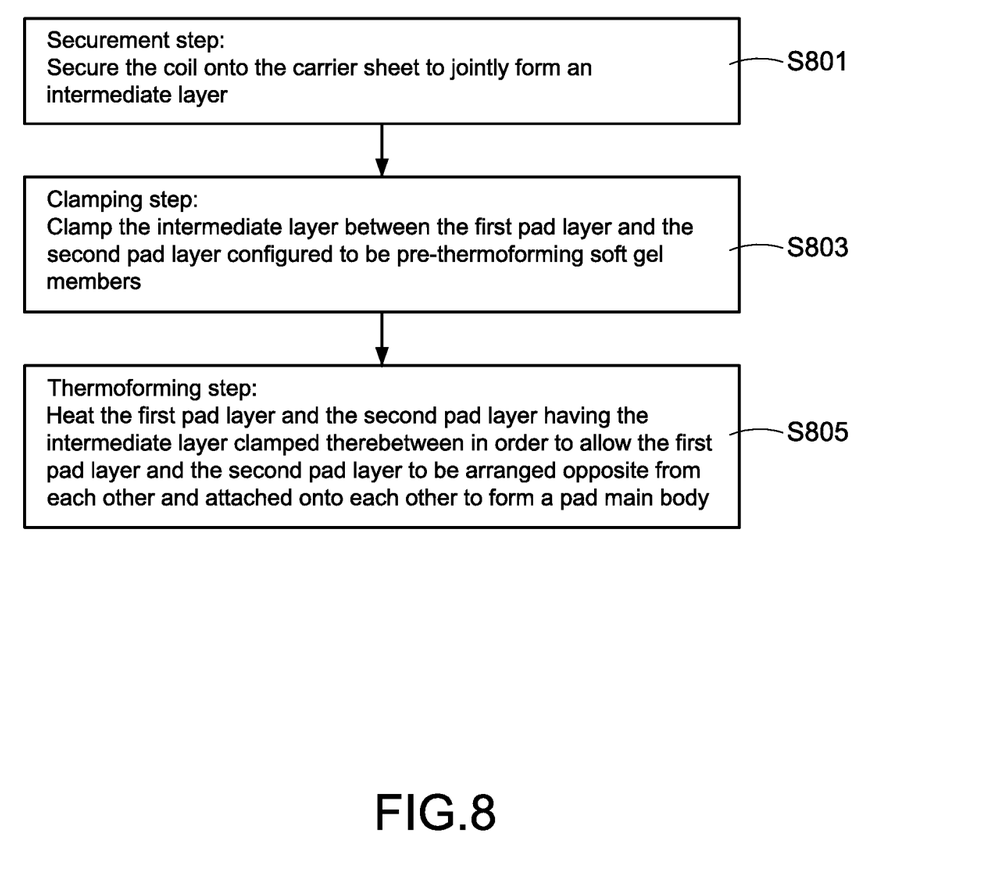
FIG. 8 is a flowchart illustrating the manufacturing process of the present invention.

As shown in FIG. 6 to FIG. 7, a third exemplary embodiment of the pad 100 of the present invention is generally the same as the first exemplary embodiment, and the difference mainly relies in the intermediate layer M3 in the third exemplary embodiment.

In the intermediate layer M3, a shape the carrier sheet 1a corresponds to a shape of the coil 2 to form a vortex winding strip 15 having a vortex winding shape. The aforementioned coil 2 is correspondingly secured onto the vortex winding strip 15. The vortex winding strip 15 includes a plurality of winding loops 151 formed in separate winding layers, and any two of the adjacent winding loops 151 are spaced apart from each other to form at least one exhaust gap 16 (as shown in FIG. 7) for exhaust of air. In addition, a width of the vortex winding strip 15 is the same as or slightly greater than a width of the coil 2. As shown in FIG. 7, the width of the vortex winding strip 15 is slightly greater than the width of the coil 2.

FIG. 8 in conjunction with FIG. 1 to FIG. 5 illustrate a manufacturing method for manufacturing the pad 100 of the present invention, comprising the following steps: a securement step S801, a clamping step S803 and a thermoforming step S805.

The securement step S801 is to secure a coil 2 onto a first surface 11 or a second surface 12 of a carrier sheet 1a, and to allow the carrier sheet 1a and the coil 2 secured onto each other to jointly form an intermediate layer M1, M2.

The clamping step S803 is to clamp the intermediate layer M1, M2 between a first pad layer 31 and a second pad layer 32. In addition, in this clamping step S803, both the first pad layer 31 and the second pad layer 32 are configured to be a pre-thermoforming soft gel member.

The thermoforming step S805 is to heat the first pad layer 31 and the second pad layer 32 having the intermediate layer M1, M2 clamped therebetween in order to allow the first pad layer 31 and the second pad layer 32 to be arranged opposite from each other and attached onto each other to form a pad main body 3.

Furthermore, for the purpose of exhaust of air, in the securement step S801, the carrier sheet 1a can be divided into a coil securement portion 13 and a remaining portion 14. The coil 2 is secured at the coil securement portion 13, and the remaining portion 14 includes a plurality of exhaust vents 141 formed thereon in order to utilize the exhaust vents 141 to perform exhaust of air.

As shown in FIG. 8 in conjunction with FIG. 6 to FIG. 7, the exhaust of air can also be achieved via other manufacturing methods. In this exemplary embodiment, a cutting step (not shown in FIG. 8) is further executed between the aforementioned securement step S801 and the clamping step S803. In addition, in the intermediate layer M3, the carrier sheet 1b is divided into a vortex winding strip 15 and at least one ready-for-cutting portion (not shown in the drawings). The coil 2 is secured onto the vortex winding strip 15. A shape the vortex winding strip 15 corresponds to a vortex winding shape of the coil 2 to form a plurality of winding loops 151 having separate winding layers. The at least one ready-for-cutting portion is formed between any two of the adjacent winding loops 151. Next, the at least one ready-for-cutting portion of the carrier sheet 1a is cut to form an exhaust gap 16.

In view of the above, a pad for wireless charging and a manufacturing method thereof of the present invention are able to achieve the expected objective and purpose of use while overcoming the drawbacks of the prior arts. In addition, the present invention is of industrial applicability, novelty and inventive step such that it complies with the patentability. Accordingly, patent application is filed according to the Patent Act in light of the grant of the patent right for the protection of the rights of the inventor.

The above description is provided to illustrate the preferred feasible embodiments of the present invention only such that it shall not be treated as limitations of the claim scope of the present invention. Any equivalent structural modifications made based on the content of the specification and drawings of the present invention shall be treated to be within the scope of the claims of the present invention.

What is claimed is:

1. A pad for wireless charging, comprising:
    a pad main body configured as a flexible pad and having a first pad layer and a second pad layer arranged opposite from each other and attached onto each other;
    a carrier sheet configured to be flexible sheet; and
    a coil secured onto a surface of the carrier sheet and jointly forming an intermediate layer with the carrier sheet; the intermediate layer clamped and secured between the first pad layer and the second pad layer,
    wherein a vortex winding strip with a vortex winding shape is formed by a shape the carrier sheet corresponding to a shape of the coil to form; the coil is correspondingly secured on the vortex winding strip; the vortex winding strip includes a plurality of winding loops formed in separate winding layers, and any two of adjacent winding loops are spaced apart from each other to form at least one exhaust gap.

2. The pad for wireless charging according to claim 1, wherein the carrier sheet is also an unmalleable sheet.

3. The pad for wireless charging according to claim 1, wherein the carrier sheet is divided into a coil securement portion and a remaining portion; the coil is secured at the coil securement portion, and the remaining portion includes a plurality of exhaust vents formed thereon.

4. The pad for wireless charging according to claim 1, wherein the carrier sheet includes a first surface and a second surface arranged opposite from each other; the coil is secured onto the first surface or the second surface; the first pad layer and the second pad layer are attached and secured onto the first surface and the second surface respectively.

5. The pad for wireless charging according to claim 1, wherein the carrier sheet is an insulating film or an insulating sheet.

6. The pad for wireless charging according to claim 1, wherein the pad is any one of a mouse pad, a non-slip pad, a cushion pad and a protection pad.

7. A manufacturing method for a pad for wireless charging, comprising:
    a securement step to secure a coil onto a surface of a carrier sheet in order to jointly form an intermediate layer;
    a cutting step to divide the carrier sheet into a vortex winding strip and at least one ready-for-cutting portion, wherein the vortex winding strip includes the coil secured thereon; to form a plurality of winding loops having separate winding layers by corresponding a shape the vortex winding strip to a vortex winding shape of the coil; to form the at least one ready-for-cutting portion between any two of adjacent winding loops; and to cut the at least one ready-for-cutting portion of the carrier sheet to form an exhaust gap;
    a clamping step to clamp the intermediate layer between a first pad layer and a second pad layer, and both the first pad layer and the second pad layer configured to be a pre-thermoforming soft gel member in the clamping step; and
    a thermoforming step to heat the first pad layer and the second pad layer having the intermediate layer clamped therebetween in order to allow the first pad layer and the second pad layer to be arranged opposite from each other and attached onto each other to form a pad main body.

8. The manufacturing method for a pad for wireless charging according to claim 7, wherein in the securement step, the carrier sheet is divided into a coil securement portion and a remaining portion; the coil is secured at the coil securement portion, and the remaining portion includes a plurality of exhaust vents formed thereon.

9. The manufacturing method for a pad for wireless charging according to claim 7, wherein in the securement step, the coil is adhesively attached onto the carrier sheet.

* * * * *